United States Patent [19]

Langley et al.

[11] 4,275,990
[45] Jun. 30, 1981

[54] DISC CHANNEL FOR COOLING ROTOR BLADE ROOTS

[75] Inventors: Kenneth R. Langley, Wotton-under-Edge; John R. D. Fuller, Bristol, both of England

[73] Assignee: Rolls-Royce Limited, London, England

[21] Appl. No.: 965,057

[22] Filed: Nov. 30, 1978

[30] Foreign Application Priority Data

Dec. 17, 1977 [GB] United Kingdom ............... 52597/77

[51] Int. Cl.³ .......................... F01D 5/18; F01D 5/30
[52] U.S. Cl. .................................. 416/95; 416/220 R
[58] Field of Search ................. 416/95, 96, 97, 92, 416/220

[56] References Cited

U.S. PATENT DOCUMENTS

| | | | |
|---|---|---|---|
| 2,647,368 | 8/1953 | Triebbnigg et al. | 416/97 |
| 2,951,340 | 9/1960 | Howald | 416/95 |
| 3,437,313 | 4/1969 | Moore | 416/95 |
| 3,490,852 | 1/1970 | Carlstrom et al. | 416/95 |
| 3,575,528 | 4/1971 | Beam et al. | 416/95 |
| 3,678,555 | 7/1972 | Hansen | 416/95 |
| 3,689,176 | 9/1972 | Howell et al. | 416/96 |
| 3,748,060 | 7/1973 | Hugoson et al. | 416/96 |
| 3,849,025 | 11/1974 | Grondahl | 416/96 |
| 3,888,601 | 6/1975 | Glassburn | 416/220 R X |
| 4,033,705 | 7/1977 | Luebering | 416/220 R |
| 4,221,542 | 9/1980 | Acres et al. | 416/220 R |

FOREIGN PATENT DOCUMENTS 590470  1/1960  Canada ..................................... 416/220

Primary Examiner—Everette A. Powell, Jr.
Attorney, Agent, or Firm—Stevens, Davis, Miller & Mosher

[57] ABSTRACT

A turbine disc for a bladed rotor assembly includes a rim, a plurality of generally axially extending slots in the rim adapted to receive the roots of rotor blades, the radially innermost surfaces of all of said slots lying at a first radius, a continuous circumferential flange projecting axially from the rim of the disc on at least one side face thereof, said flange providing a continuous circumferentially extending surface at a radius less than said first radius and being connected to the disc at a radius greater than said first radius, and a continuous circumferentially extending cooling air channel open towards the radially inner side of the flange, and extending radially outwardly between the flange and the side face of the disc to an extent sufficient to intersect the bottom and a portion of at least one of the flanks of each of the blade root-receiving slots.

7 Claims, 4 Drawing Figures

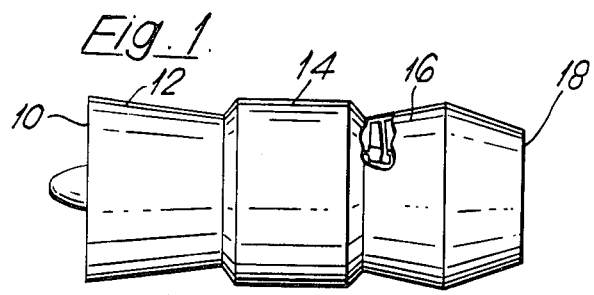
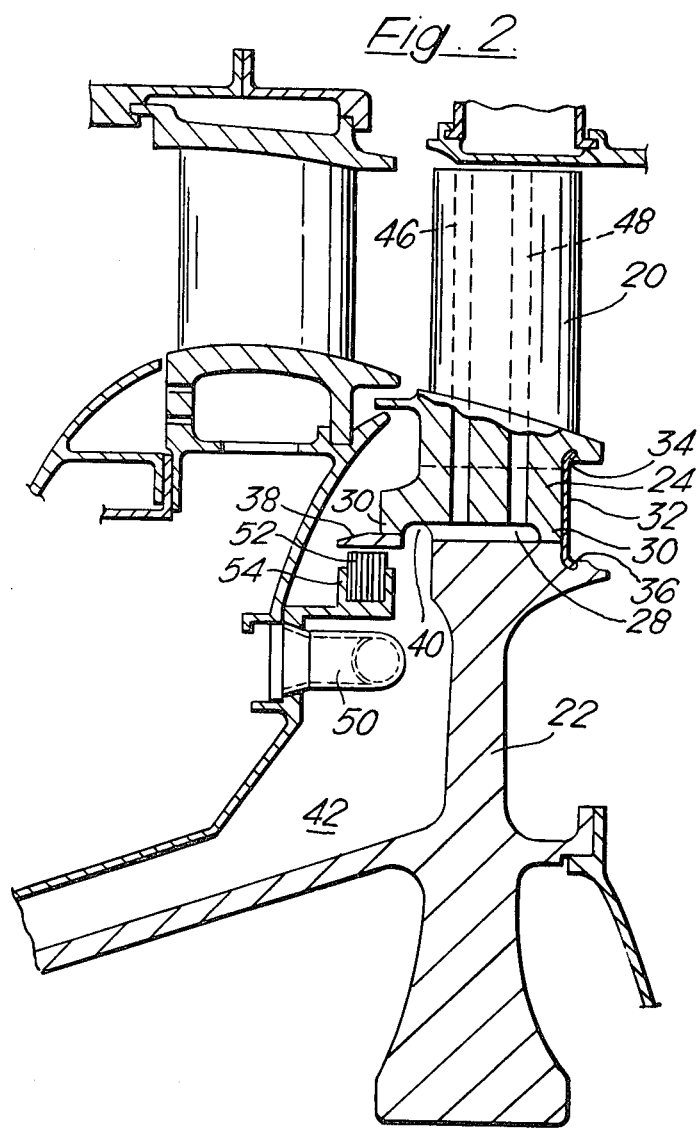

DISC CHANNEL FOR COOLING ROTOR BLADE ROOTS

This invention relates to bladed rotor assemblies and particularly to turbine discs for such assemblies.

A conventional bladed rotor assembly consists of a rotor disc which has axially extending slots in its rim in which the blades are held by suitably shaped blade root formations. Where the blades are to be cooled they are formed with internal passages which extend lengthwise through the blade into the root. Cooling air for the blades is fed to each blade via the root, and a convenient way of allowing entry of the cooling air to the passages in the blade roots is to enlarge the bottom of each axial slot in the disc rim to provide a chamber in the disc below the blade root into which the cooling air is fed.

The cooling air is usually provided from the compressor section of the engine and is fed at high pressure to a chamber upstream of the rotor disc prior to entry into the blade root slots. Seals must be provided to prevent escape of the cooling air from the chamber.

In one construction the chamber is sealed at the disc rim, the seal being of the labyrinth type which consists of one or more circumferentially extending radial fins on an arm attached to the static structure upstream of the disc, and which extends to within close proximity of a continuous circumferential sealing surface carried on the rim of the disc.

To provide a continuous circumferential sealing surface which is integral with the disc rim, the greatest radius at which it can be provided is just radially inwards of the bottom of the blade root-receiving slots. This has meant in the past that, in order to provide communication between the cooling air chamber radially inwardly of the seal, and the blade root-receiving slots, holes have had to be drilled in the disc rim. This, however, not only limits the amount of cooling air which can pass into the blade roots but also produces stress concentrations in the disc which can severely limit disc life.

In an alternative construction which avoids the need to drill holes in the disc, a cover plate is provided which is spaced from the disc face and which defines therewith a flow path for cooling air in the chamber to the rim of the disc. The cover plate is connected to the disc at a radius greater than that at which the radially inner surfaces of the blade root-receiving slots lie, and, since the cover plate rotates with the disc, it provides a seal at this radius. A disadvantage with this construction is, of course, the weight penalty introduced by the cover plate which has no other function than to provide a rim seal and a flow path for the cooling air into the blade roots. This weight penalty can be severe in the case of a disc with a high rotational speed since the rim of the disc is likely to be outside the "free hoop" radius of the rotating assembly, so that the parts of the cover plate which extend to the rim of the disc have to be supported with additional material inside the "free hoop" radius. This additional material is usually provided as an enlargement of the plate thickness at the smallest possible radius. Since the rotor disc itself also has an enlargement at its innermost radius for the same reasons, this can mean that the point of contact of the cover plate with the disc rim is axially offset from the enlargement, which in turn gives rise to greater stresses in the cover plate and a still heavier design.

The object of the present invention is to provide a bladed rotor assembly which enables adequate cooling air to be supplied to the roots of the blades without the need to drill holes in the disc rim, while at the same time allowing for the chamber to be sealed without the above-described disadvantages of the cover plate constructions.

According to the present invention a turbine disc for a bladed rotor assembly comprises a rim, a plurality of generally axially extending slots in the rim adapted to receive the roots of rotor blades, the radially innermost surfaces of all of said slots lying at a first radius, a continuous circumferential flange projecting axially from the rim of the disc on at least one side face thereof, said flange providing a continuous circumferentially extending surface at a radius less than said first radius and being connected to the disc at a radius greater than said first radius, and a continuous circumferentially extending cooling air channel open towards the radially inner side of the flange, and extending radially outwardly between the flange and the side face of the disc to an extent sufficient to intersect the bottom, and a portion of at least one of the flanks, of each of the blade root-receiving slots.

The flange provides a continuous sealing surface opposite which a co-operating sealing element may be provided to provide a seal.

Preferably the blade root-receiving slots are dimensioned to have greater radial depth than the blade roots to be received therein so that, when the blade roots are in position a cooling air passage is left between the bottom of the blade root and the bottom of the slot through which cooling air from the channel may pass into cooling air holes in the blades.

The invention also includes a bladed rotor assembly comprising a disc as described above together with a plurality of blades positioned with their blade roots in the blade root-receiving slots in the disc rim. In such an assembly each blade root is provided with holes extending therethrough to communicate with cooling air passages in the blade and one such hole in the blade root may be directly aligned with the circumferential channel and communicate with a passage in the leading edge of the blade in order to provide communication directly from the channel to the blade leading edge with minimum pressure loss.

The chamber from which the cooling air is supplied to the cooling air channel is sealed adjacent the rim of the disc, and in a preferred form of the invention the seal takes the form of a continuous circumferential mass of bristles tightly packed together and sandwiched between the sides of a channel member supported on static structure and positioned to co-operate with the continuous surface of the flange on the disc. Alternatively, a cover plate may be provided, which is carried by the disc and which has a continuous surface at its periphery which co-operates with the flange to form a seal.

For a better understanding of the invention an embodiment thereof will be more particularly described by way of example only, and with reference to the accompany drawings in which:

FIG. 1 is a pictorial view of a gas turbine engine having a portion of the turbine casing broken away to disclose a diagrammatic view of an embodiment of the present invention;

FIG. 2 is an enlarged cross-sectional view of the turbine of the engine of FIG. 1 showing in greater detail the embodiment of the invention;

Figure 3:
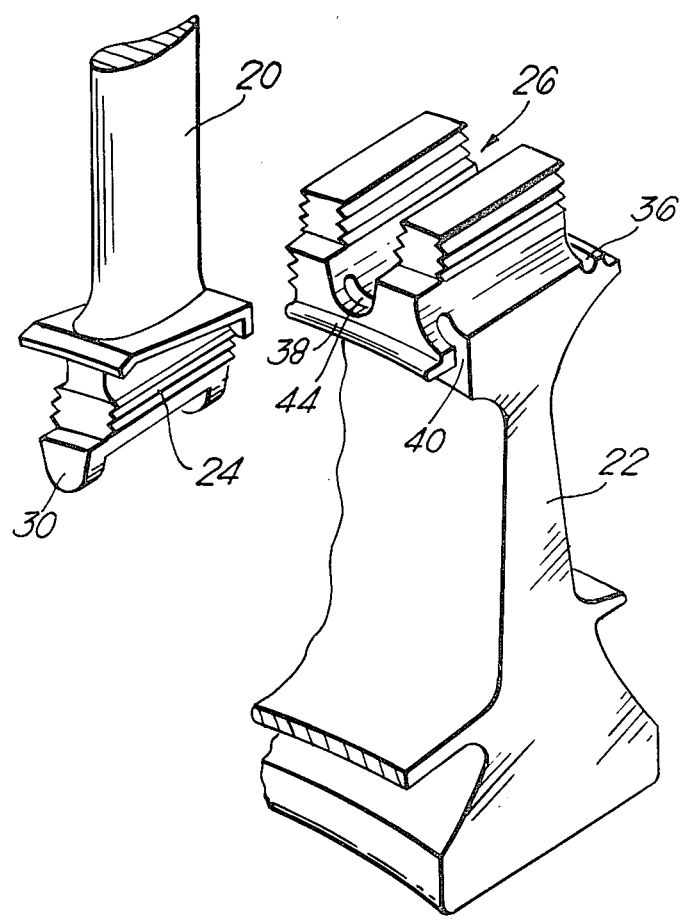
FIG. 3 shows an exploded pictorial view of the turbine disc and blade assembly of the turbine of FIG. 2; and, FIG. 4 is a view similar to FIG. 2 of an alternative construction of the invention.

Referring to the drawings, a gas turbine engine shown in FIG. 1 comprises in flow series, an intake 10, a compressor section 12, combustion equipment 14, a turbine section 16 and an exhaust nozzle 18.

The turbine section 16 includes several bladed rotor assemblies each including a row of rotor blades 20 carried by a rotor disc 22. One such assembly is shown in FIG. 2. The individual turbine blades 20 are each provided with a conventional fir-tree root 24 (FIG. 3) which engages a correspondingly shaped blade root-receiving slot 26, machined within the rim of the disc. The slots 26 extend in a generally axial direction and the radially innermost surfaces of all of the slots lie at the same radius.

The radial depth of each slot 26 is greater than that of the corresponding blade root 24 so that a passage 28 is formed between the bottom of each slot 26 and the bottom of the corresponding blade root 24. The passage 28 is sealed at each end by tangs 30 extending radially from the bottom of the blade root 24, and which are dimensioned to be a close fit in the slot 26 to prevent escape of the cooling air therefrom. A segmented locking plate 32 at the downstream end of the slot 26 engages recesses 34 and 26 respectively in the undersides of the blades and in the disc rim to restrain the blades against axial movement.

In an alternative arrangement (not shown) the rear tang 30 on the blade may be omitted, the locking plate 32 may be arranged to act as a sealing plate (in known manner), and further sealing plates may be provided between the forward tang 30 and the bottom of the slot 26.

A flange 38 is formed integrally on the rim of the disc at a radius greater than the radius of the radially innermost surfaces of the slots 26, i.e. at a radius at which the disc rim is non-continuous circumferentially. The flange extends radially inwardly to a radius which is less than that of the bottom surfaces of the slots 26, and at which the flange can become continuous circumferentially and can provide a circumferentially continuous sealing surface.

A continuous radially inward facing circumferential channel 40 is formed in the flange 38 adjacent the disc face, and the radial depth of the channel is such that it intersects the bottom surfaces and the side flanks of all of the slots 26. The channel 40 provides a means whereby cooling air from a chamber 42 upstream of the disc can pass into each of the passages 28 beneath the respective blade roots, and avoids the necessity of producing holes in the disc rim for this purpose. It can be seen that the channel 40 as it breaks into the slots 26 produces crescent-shaped entry holes 44 for the cooling air entering the passages 28. This feature of the invention not only provides a greater entry area than would be possible without a large number of individual holes, but also minimizes pressure losses in the cooling air flow by reducing the amount of turning which the cooling air has to undergo to pass from the chamber 42 to the passages 28.

Figure 4:
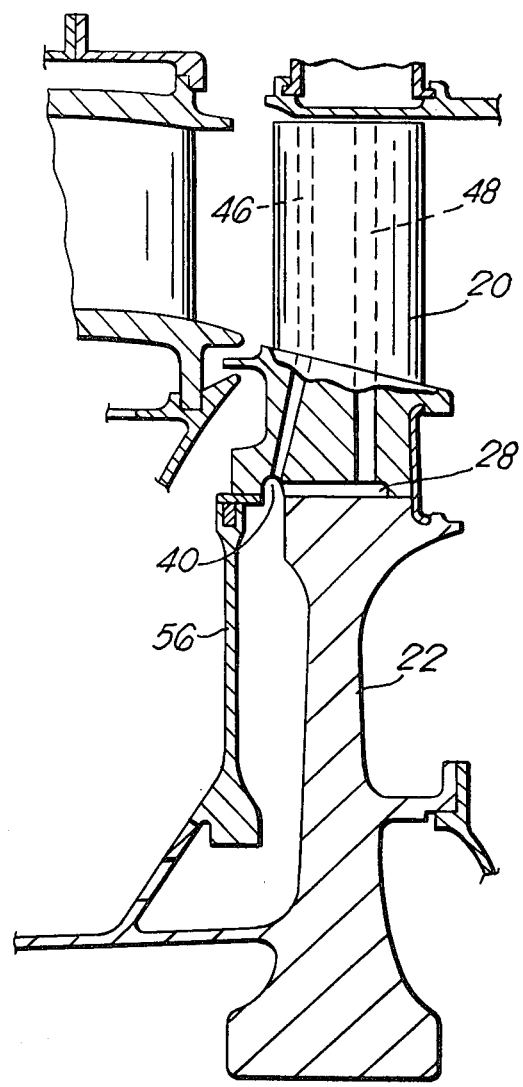

Each of the blades 20 has cooling air holes 46, 48 extending through the root portion 24 and into the main body of the blade. These holes may be provided in any suitable numbers, shapes or patterns depending on the cooling requirements of the particular blade. A further advantage of the present invention is that where the cooling requirements dictate that the cooling air at the leading edge of the blade should be at the greatest pressure, it is possible to form the leading edge hole 46 in such manner that it communicates directly with the channel 40 so that the cooling air can pass directly to the leading edge hole without suffering pressure losses by first being turned into the passage 28. This alternative feature is illustrated in FIG. 4.

The required cooling air is supplied from the compressor section of the engine to the chamber 42 via pre-swirl nozzles 50, as is well known in the art. The chamber 42 is sealed to prevent escape of cooling air, by a seal adjacent the rim of the disc. One element of the seal consists of a plurality of bristles 52 tightly-packed and sandwiched between the sides of a channel-shaped member 54 connected to static structure upstream of the disc. The bristles run in light contact with the continuous surface of the flange 38 which constitutes the other element of the seal. This type of brush seal element has been found to be more effective than the conventional labyrinth seals, so that a single annular brush, can replace three or four fins on a labyrinth seal. Hence the axial length of the flange and the consequent centrifugal bending forces thereon can be kept to a minimum using a brush type of seal. As an alternative form of seal for a high speed, large diameter rim seal, a cover plate design could be used. In such a design as illustrated in FIG. 4 a seal is provided between the flange 38 and the radially outer rim of a cover plate carried by the disc, and the seal between the rotating cover plate and static structure can be made at a lesser radius. In this case the cover plate design can be much simpler and lighter than the conventional cover plates because:

(a) the radius of the seal between the flange 38 and the cover plate is less, being below the bottom surface of the slots 26, so that less cover plate material is outside the free hoop radius, and (b) the rim of the cover plate now contacts the flange and is axially displaced from the disc rim by at least the width of the channel 40.

Thus the construction of the present invention can provide a simpler and lighter disc with no holes in its rim, and when used with a brush seal can avoid the use of a cover plate, but where a cover plate is used, the cover plate itself can be of simpler and lighter design.

We claim:

1. A turbine disc for a bladed rotor assembly comprising a rim, a plurality of generally axially extending slots in the rim adapted to receive the roots of rotor blades, the radially innermost surfaces of all of said slots lying at a first radius, a continuous circumferential flange integral with and projecting axially from the rim of the disc on at least one side face thereof, said flange defining a continuous circumferentially extending surface at a radius less than said first radius and being integrally connected to the disc at a radius greater than said first radius, and a continuous circumferentially extending cooling air channel open towards the radially inner side of the flange, and extending radially outwardly between the flange and the side face of the disc and intersecting and opening into and through the radially innermost surface and a portion of at least one of the flanks of each of the blade root-receiving slots whereby air entering said cooling air channel issues into said blade receiving slots below a corresponding blade root.

2. A turbine disc as claimed in claim 1 and in which the blade root-receiving slots are dimensioned to have greater radial depth than the blade roots to be received therein so that when the blade roots are in position a cooling air passage is left between the bottom of the blade root and the bottom of the slot through which cooling air from the channel may pass into cooling air holes in the blades.

3. A bladed rotor assembly comprising a rotor disc as claimed in claim 2, a plurality of rotor blades each having a root engaged in a slot, each blade having at least one cooling air hole extending through the root to communicate with said cooling air passage.

4. A bladed rotor assembly as claimed in claim 3 and in which each blade has a leading edge and a trailing edge and has a cooling air hole extending lengthwise therethrough adjacent the leading edge, said cooling air hole communicating through the root of the blade with the cooling air channel.

5. A bladed rotor assembly as claimed in claim 3 and in which a face of the rotor disc defines the end wall of a chamber from which cooling air is supplied to the blades, a sealing element being provided for co-operation with the continuous surface on the flange to provide a seal for the chamber adjacent the rim of the rotor disc.

6. A bladed rotor assembly as claimed in claim 5 and in which the sealing element comprises a mass of tightly-packed bristles sandwiched between the sides of a generally channel-shaped member which is supported on static structure adjacent the rotor disc.

7. A bladed rotor assembly as claimed in claim 5 comprising a cover plate connected to the disc for rotation therewith and defining with the disc a flow path for cooling air communicating with the cooling air channel, said cover plate having a continuous circumferentially extending surface at the radially outer periphery thereof which co-operates with the continuous circumferential sealing surface on the flange to provide said seal.

* * * * *